United States Patent [19]

Kilgore

[11] 4,186,710
[45] Feb. 5, 1980

[54] VEHICLE DIGITAL ANTI-THEFT SYSTEM

[76] Inventor: Woodson B. Kilgore, 31827 Maine, Livonia, Mich. 48150

[21] Appl. No.: 931,377

[22] Filed: Aug. 7, 1978

[51] Int. Cl.² .............................................. B60R 25/00
[52] U.S. Cl. .............................. 123/146.5 B; 180/289; 307/10 AT; 340/64
[58] Field of Search ...................... 123/198 B, 146.5 B; 180/114; 340/63, 64; 307/10 AT

[56] References Cited

U.S. PATENT DOCUMENTS

| | | | |
|---|---|---|---|
| 1,775,924 | 9/1930 | Alkman | 123/146.5 B |
| 2,843,843 | 7/1958 | Davis | 123/146.5 B |
| 3,611,287 | 10/1971 | Marchoff | 180/114 |
| 3,619,633 | 11/1971 | Brandon | 180/114 |
| 3,634,697 | 1/1972 | MacFarlane | 180/114 |
| 3,691,396 | 9/1972 | Hinrichs | 180/114 |
| 3,755,777 | 8/1973 | Lee | 180/114 |
| 3,818,436 | 6/1974 | Hong | 180/114 |

Primary Examiner—Ira S. Lazarus
Attorney, Agent, or Firm—Charles W. Chandler

[57] ABSTRACT

An anti-theft device for an automotive vehicle or any internal combustion engine turned over by a starter, in which electrical energy is connected to the starter only at such times as several rotatable digital members are arranged in selected positions. The digital control means may be positioned in either of two alternative coded positions to energize the starter depending upon the position of a hidden switch which the user manipulates according to the particular code he desires.

The digital means are connected to the starter such that an unauthorized "hot wire" creates a short circuit for the thief. Similarly, the ignition coil is so wired as to provide a short circuit if the thief should attempt to hot wire the ignition coil.

6 Claims, 2 Drawing Figures

VEHICLE DIGITAL ANTI-THEFT SYSTEM

BACKGROUND OF THE INVENTION

This invention is related to anti-theft devices for automotive vehicles, and more particularly to digital means for preventing the energization of either the engine starting motor or the ignition coil unless the digital means are manipulated to predetermined selected positions.

Automobiles are often stolen because the owner has forgotten the ignition key in the ignition switch, or because the ignition key was left in a parking lot to provide an opportunity for an attendant to either duplicate the key or to observe the code of an anti-theft system.

A variety of systems have been disclosed in the prior art for use in automobiles to prevent theft. Such prior art systems usually fail to deter thieves who physically remove the ignition key mechanism and then "hot wire" the starting motor and the ignition coil.

SUMMARY OF THE INVENTION

The broad purpose of the present invention is to provide a digital control means which the user must manipulate to a coded sequence of numbers in order to energize the vehicle. The digital means is prominently mounted adjacent the dash board, readily accessible to the user. A hidden switch, also accessible to the user, allows him to select either of two coded numbers to be entered on the digital means to energize the starter. Although a person such as a parking lot attendant may be aware of one of the coded numbers, he would not be aware of the other.

The preferred system incorporates a normally open switch between the ignition switch and the starting system which prevents the starting motor from being energized unless the digital means are in a coded sequence. Upon starting the vehicle, the user readjusts the digital control means to a random number so that if a thief takes the vehicle while the engine is running, he cannot restart it in the event the engine stalls or is de-energized.

In the preferred embodiment of the invention, both the starting motor and the ignition coil are provided with circuitry for grounding a hot wire should a thief attempt to directly connect either of these devices to the battery without first properly adjusting the digital control means and turning the ignition key in the conventional manner.

The preferred embodiment of the invention requires a minimum of mechanical and electrical components, all commercially and readily available and which can be easily installed in a conventional automotive vehicle.

The digital control means preferably has a multiple wire cable connecting the control housing to the vehicle to make it difficult for a thief to select the wires that actually connect the control means to the ignition circuit. Should the thief cut all the wires leading from the control device, the starting motor cannot be energized because of its grounded condition.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
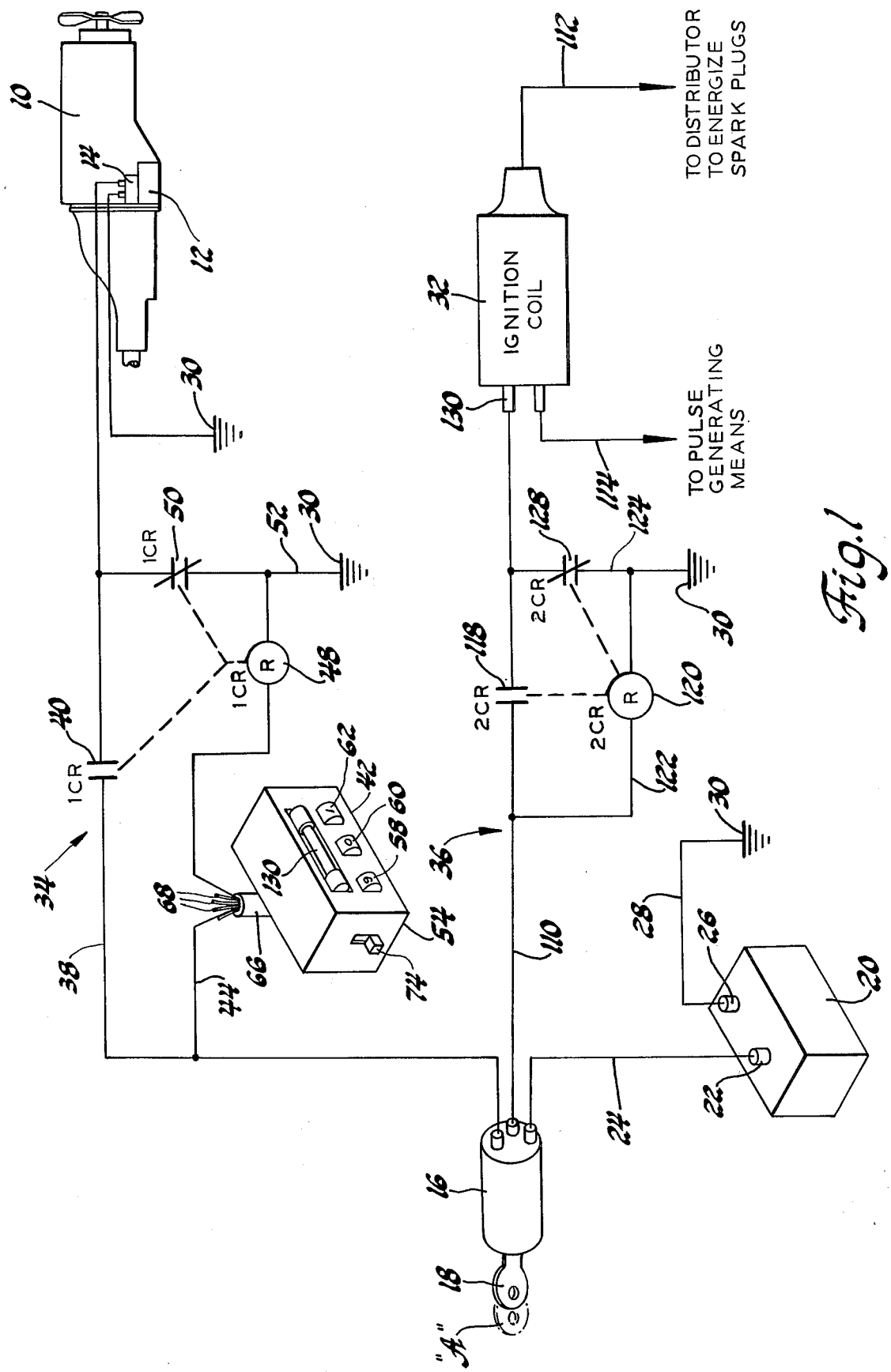
FIG. 1 is a diagrammatic view of the preferred embodiment of the invention.

Referring to the drawings, FIG. 1 illustrates a conventional automotive vehicle engine 10 having a starter 12 operatively connected to a solenoid 14.

An ignition switch 16 is operated by a key 18 which is movable between several conventional positions including a "start" position illustrated in FIG. 1, and an "ignition contact circuit" position illustrated in phantom at "A".

A battery 20 has a pole 22 connected by conductor 24 to ignition switch 16, and a second pole 26 connected by conductor 28 to vehicle frame 30 to which the battery is grounded. When key 18 is in its start position, it is operable to provide a full 12 volts to starting motor 12 as well as voltage to an ignition coil 32. When engine 10 is turning over, the user releases key 18 which then moves toward position "A" to de-energize the starter but continue providing current to the ignition coil.

A circuit 34 provides means for conducting energy from battery 20 to starter 12, and a circuit 36 provides means for electrically connecting the battery to the ignition coil. Each of the circuits depend upon key 18 being in a predetermined position with respect to ignition switch 16.

Circuit 34 includes conductor means 38 connecting ignition switch 16 to solenoid 14. A normally open relay contact 40 is inserted in conductor means 38 between switch 16 and solenoid 14. A normally closed relay contact 50 has one side connected between contact 40 and solenoid 14, and its opposite side grounded at 30. Thus the starter solenoid is electrically grounded at such times as relay contact 40 is open and relay contact 50 is closed.

Digital means 42 is connected by conductor 44 to conductor 38 between relay contact 40 and ignition switch 16. A relay 48 has one side of its coil connected between digital means 42 and its opposite side connected to ground 30 by conductor 52.

Digital means 42 includes a three station thumb wheel switch 56 mounted in housing 54, and includes three digital members 58, 60, and 62 which may be individually manipulated by the user to a selected position chosen from a possible ten positions. Relay 48 cannot be energized to open contact 50 and close contact 40 unless digital means 42 has been set to a selected position of digital members 58, 60, and 62. A three pole double-throw switch 64 illustrated in FIG. 2 is either mounted in housing 54 or is remotely mounted.

Preferably a 30 wire cable 66 is connected to housing 54 and has a plurality of wires 68 connected between the digital switch and the automotive vehicle body (not shown) as well as conductors 44 and 46.

Figure 2:
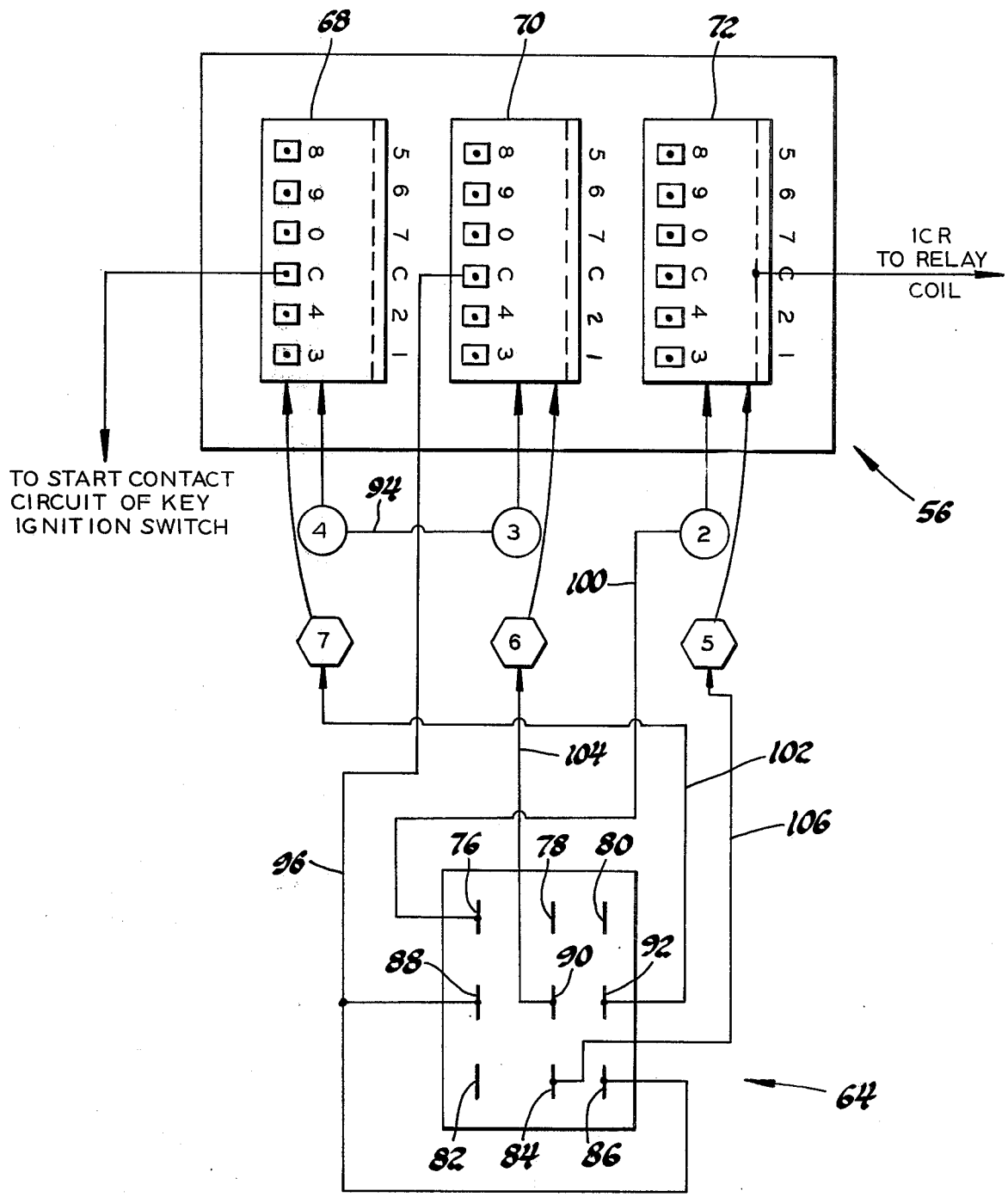
FIG. 2 is a schematic view showing the manner in which the digital control means is wired.

Referring to FIG. 2, a thumb wheel switch 56 has three stations 68, 70, and 72, each station having ten output terminals and a pair of common terminals.

Each terminal of each station is connected to the common terminal. Each station also has two selected terminals connected to provide alternative paths for connecting the ignition switch to relay coil 48. Thus two selected sequences of numbers are wired to slide switch 64, illustrated in FIG. 2, so that the user can form a connection between the ignition switch and relay coil 48 depending upon the position of switch 64 which is movable between either an upper position or a lower position. Switch 64 has button 74 mounted on housing 54 so as to have two operative positions depending upon whether button 74 is in its upper position or its lower position. Switch 64 has three upper terminals 76, 78, and 80 normally closed to terminals 88, 90, and 92, respectively, when button 74 is pushed upwardly.

Three lower terminals 82, 84, and 86 are open when the button is in its upward position. In the downward position, a common terminal 88 is connected to terminal 82, a common terminal 90 is connected to terminal 84, and a common terminal 92 is connected to terminal 86.

The user wires switches 56 and 64 for two separate discrete numbers each composed of three digits. Assuming the first discrete number is 2 3 4, a conductor 94 is connected between terminal No. 4 of station 68 and terminal No. 3 of station 70. A conductor 96 connects the common terminal of station 70 to the common terminal 88 of switch 64, and to terminal 76 to terminal No. 2 of station 72. The common terminal of station 72 is connected to relay coil 48.

The arrangement is such that when button 74 is in its upper position, a circuit is completed from the common terminal to terminal No. 4 of station 68, to terminal No. 3 of station 70, and then from the common terminal of station 70 to the common terminal 88 through to terminal 76 of switch 64, through conductor 100 to terminal No. 2 of station 72, then to the common terminal of station 72 to relay 48.

Assuming the other discrete number is 5 6 7, conductor 102 is connected from terminal No. 7 of station 68 to terminal 92 of switch 64. A conductor 104 connects terminal 90 to terminal No. 6 of station 70, and a conductor 106 connects terminal 84 to terminal No. 5 of station 72. Continuity through the first set of discrete numbers 2 3 4 is broken and continuity established between terminals 5 6 7 when the button is in its lower position.

The arrangement is such that each of the thumb wheels of stations 68, 70, and 72 can be moved to any of ten positions. However, when button 74 of switch 64 is in its upper position, the thumb wheels must be moved to positions in which they establish continuity through terminals 2, 3, and 4 of the three stations to establish continuity between the ignition switch and relay coil 48. When button 74 is in its lower position, the thumb wheels must be manipulated to the stations establishing contact through terminals 5, 6, and 7 to energize coil 48. It is apparent that the user can wire the three stations to any desired three digit code. Although the button of slide switch 64 is illustrated as being mounted on the side housing 54, it can be mounted in any convenient place within the passenger compartment of the vehicle.

When relay 48 is energized, normally open relay contact 40 closes to energize starter 12, and normally closed contact 50 opens the ground connection between the starter and ground conductor 52. Preferably, after starting the engine the user rotates the thumb wheels to a random sequence so that the vehicle cannot be started again unless the digital control means is manipulated to the exact coded sequence. Similarly, when button 74 is in its lower position, starter 12 can be started only when the appropriate discrete number 5, 6, and 7 is arranged by manipulating digital members 58, 60, and 62.

Referring to FIG. 1, conductor 110 connects the ignition contact terminal of ignition switch 16 to ignition coil 32. The output of ignition coil 32 is through a conductor 112 to the distributor to energize the spark plugs (not shown), and through a conductor 114 to an appropriate pulse generating system (not shown) in the manner well known to those skilled in the art. A normally open relay contact 118 is connected in conductor 110. One side of coil 120 of contact 118 is connected in conductor 124 to a normally closed relay contact 128 and to ground 30. When relay 120 is energized, its normally closed contact 128 opens and its normally open contact 118 closes.

Conductor 110 is connected to an ignition coil terminal 130 which is normally the terminal connected by a hot wire (not shown) employed by a thief for connecting the battery to the ignition.

Assuming the engine has not been started and key 18 is not in the engine start position, switch 128 is closed to ground the ignition coil. When a hot wire is connected to terminal 130, the thief experiences an electrical shock because the positive side of the battery is also connected to ground. In many cases, his jumper wire will burn up in his hand.

When the engine has been properly started by appropriately manipulating the digit control means with key 18 in the start position, relay 120 automatically closes contact 118 to energize the ignition coil and opens contact 128 to break the connection between terminal 130 and ground.

Thus the user can leave his key 118 in the ignition switch and safely leave his vehicle as long as the digit control means is not in the properly coded position. The thief then has to take the time to manipulate the three thumb wheels to a properly coded position. If he believes he knows the properly coded position he may be attempting an impossible task if the button 74 is in the wrong position.

Assuming the thief attempts to hot wire the vehicle, he will make only a connection between the battery and ground to form a shower of sparks for his efforts. A by-pass switch (not shown) can be connected in conductors 52 and 124 to enable a mechanic to perform repairs. A light 130 is mounted above members 58, 60, and 62 for illuminating the digit means by appropriate connections to the dome light circuit (not shown) of the vehicle so that the user can start the vehicle in the evening. The digital switch may be of the type internally luminated by light emitting diodes (LED).

Having described my invention, I claim:

1. In combination with a motor vehicle having an engine, a source of electrical energy, and electrical starter means operable to turn said engine, a plurality of digital members, each digital member being movable to a plurality of positions, including a first selected position and a second selected position, said digital members being disposed in a first coded arrangement when each digital member is disposed in its respective first selected position, and being disposed in a second coded arrangement when each digital member is disposed in its respective second selected position;

an ignition key;

electrical circuit means including an ignition key switch for connecting said source of electrical energy to said starter means to energize same at such times as the ignition key is in a predetermined position in said ignition switch;

a control switch movable between a first position and a second position, said control switch being connected in said circuit means such that the starter means is connected to the source of electrical energy to turn said engine in response to manipulation of the key in said ignition key switch either when the control switch is disposed in said first position and the digital members are disposed in said first coded arrangement, or the control switch is disposed in said second position and the digital members are disposed in said second coded arrangement, but manipulation of the key in said ignition switch is inoperable to energize the starter means when the digital members are not in a coded arrangement corresponding to the position of the control switch.

2. A combination as defined in claim 1, in which the vehicle has a frame and the source of electrical energy comprises a battery having a first pole and a second pole, the first pole being electrically connected to the frame, and including conductor means electrically connecting the starter means to the vehicle frame to prevent energization of the starter means; switch means and in said conductor means for opening a connection between the starter means and the frame when said digital members are in either said first coded arrangement or said second coded arrangement corresponding to the position of the control switch.

3. A combination as defined in claim 1, in which the vehicle has a frame and an ignition circuit, and the source of electrical energy comprises a battery having a first pole and a second pole, the first pole being connected to the frame, and said circuit means being adapted for connecting the second pole to the ignition coil, and second conductor means connecting the ignition coil to the vehicle frame to prevent energization of the ignition circuit, and switch means in said conductor means for opening the connection between the ignition coil and the frame when said digital members are in either said first coded arrangement or said second coded arrangement corresponding to the position of the control switch.

4. In combination with a motor vehicle having an engine,
a vehicle frame;
a battery having a first pole and a second pole;
electrical starter means;
an ignition coil in said ignition circuit;
first conductor means connecting the vehicle frame to the starter means to prevent energization thereof, and a first switch for opening said first conductor means;
second conductor means connecting the vehicle frame to the ignition coil to prevent energization thereof, and a second switch for opening said second conductor means;
means connecting the first pole of the battery to the frame;
an ignition key;
electrical circuit means including an ignition key switch; and
a plurality of digital members, each digital member being movable to a plurality of positions, including a first selected position and a second selected position, said digital members being disposed in a first coded arrangement when each digital member is disposed in its respective first selected position, and being disposed in a second coded arrangement when each digital member is disposed in its respective second selected position;
a control switch movable between a first position and a second position, said control switch being connected to the circuit means such that it is adapted to form a connection between the second pole of the battery and both the starter means and the ignition coil when the control switch is disposed in either said first position and the digital members are disposed in said first coded arrangement, or in said second position and the digital members are disposed in said second coded arrangement; and
the ignition key switch is so connected to the first switch and the second switch to open same in response to the key being moved in said ignition key switch whereby the starter means and the ignition coil are energized by the battery.

5. A combination as defined in claim 1, including a plurality of electrical wire being connected to the digital means, including selected wires for connecting the digital means to said circuit means.

6. A combination as defined in claim 1, in which the ignition key is movable from a first position for energizing the starter means to a second position in which the ignition coil is energized.

* * * * *